United States Patent [19]
Franz et al.

[11] 3,893,865
[45] July 8, 1975

[54] METHOD FOR STABILIZING A CHEMICAL FILMING COMPOSITION

[75] Inventors: Helmut Franz, Oakmont; David E. Lecoco, New Kensington, both of Pa.

[73] Assignee: PPG Industries, Inc., Pittsburgh, Pa.

[22] Filed: Nov. 28, 1972

[21] Appl. No.: 310,066

Related U.S. Application Data

[62] Division of Ser. No. 111,904, Feb. 2, 1971.

[52] U.S. Cl. .................... 106/1; 117/35 S; 117/54; 117/124 C; 117/130 E; 117/130 B
[51] Int. Cl. ............................................. C23c 3/02
[58] Field of Search ............ 106/1; 117/35 S, 47 A, 117/54, 124 B, 124 C, 130 E, 130 B

[56] References Cited
UNITED STATES PATENTS

| | | | |
|---|---|---|---|
| 2,430,581 | 11/1947 | Pessel | 106/1 |
| 2,560,979 | 7/1951 | Pessel | 106/1 |
| 2,766,138 | 10/1956 | Talmey | 106/1 |
| 3,024,134 | 3/1962 | Nixon et al. | 106/1 |
| 3,403,035 | 9/1968 | Schneble et al. | 106/1 |
| 3,674,517 | 7/1972 | Miller | 106/1 |

*Primary Examiner*—Lorenzo B. Hayes
*Attorney, Agent, or Firm*—E. Kears Pollock

[57] ABSTRACT

Uniform films having a metallic luster and a light transmittance of about 5 to 35 percent are deposited at a controllable rate with a metal-reducer filming composition that is stabilized with a mono-carbonyl composition, such as ketones and condensed ketones.

19 Claims, 8 Drawing Figures

METHOD FOR STABILIZING A CHEMICAL FILMING COMPOSITION

This is a division, of application Ser. No. 111,904, filed Feb. 2, 1971.

CROSS REFERENCES TO RELATED APPLICATIONS

This application is related to Ser. No. 829,755 now U.S. Pat. No. 3,672,939, filed June 21, 1969. This application is also related to Ser. Nos. 57,451, 57,575, now abandoned and 57,754, now U.S. Pat. No. 3,674,517 filed on July 23, 1970 in the name of R. G. Miller, and entitled "Wet Chemical Method of Producing Transparent Metal Films," "Transparent Metal-Boron Coated Glass Articles" and "Solution For Depositing Transparent Metal Films," respectively. This application is also related to Ser. No. 57,527, filed on July 23, 1970 in the names of R. C. Crissman and C. B. Greenberg and entitled "Wet Chemical Method of Producing Transparent Metal Films". The disclosures of the above-mentioned related applications are incorporated herein by reference.

BACKGROUND OF THE INVENTION

This invention relates to chemical plating, and more particularly, it relates to improved chemical compositions or depositing uniformly thin transparent metal-boron films at a rapid and highly controllable rate.

Of particular interest is a solution capable of providing activated glass or clear plastic sheets with a metal-boron film having a metallic luster and light transmission characteristics permitting the use of such sheets as viewing closures, especially multiglazed viewing closures which normally permit vision from the inside of a building on which they are mounted and which restrain or limit heat transfer either from the sun's rays or from the interior of the building.

In the provision of such closures it is important not only to limit the degree of heat transfer therethrough but also to provide sheets which have an attractive color and a relatively uniform reflectivity.

Such uniformity is especially important when such closures are installed in buildings of contemporary architecture which provide an essentially continuous glazed wall, at least in the vertical direction. When glass of the type herein contemplated is installed, considerable reflection can be observed from outside the building. Accordingly, it will be appreciated that non-uniformity in reflectivity results in a very unsightly appearance.

As disclosed in the herein mentioned related applications, uniformly transparent metal-boron films can be deposited from a filming composition comprising a chelated metal compound and an alkali metal borohydride containing reducing solution by spraying the filming composition onto an activated transparent substrate. However, as pointed out in the Miller application Ser. No. 57,451, an activated glass sheet that is coated with a metal and boron containing film by a relatively short single spray application of the intermixed filming compositions illustrated therein generally has a luminous transmission of from about 25 to about 40 percent when the filming capacity of the composition has depleted and filming has effectively ceased.

It is believed that this depletion phenonomon and consequent limit of about 25 to about 40 percent luminous transmission for a single spray application is due to the fact that in addition to metal deposition on the activated substrate, a reaction occurs in the filming composition which results in the homogeneous precipitation of the contemplated metal in the bulk of the filming composition which is not in contact with the activated substrate. This homogeneous or bulk precipitation reaction appears to occur relatively spontaneously after a certain inhibition period which depends primarily on the temperature, pH and concentration of the filming composition; the einhibition period of the filming compositions disclosed in the above-mentioned related application generally being the range of about 8 to about 20 seconds. It will be appreciated that this bulk precipitation reaction affects the filming composition in several ways. For example, the compositions will have a very limited pot-life, i.e., the period in which the reactants present in the filming composition retain their activity. In addition, bulk precipitation depletes the compositions of metal and reducer, and therefore decreases the metal deposition rate. Bulk precipitation also affects the pH value of the filming compositions which, in turn, tends to affect the composition of the deposited film. Such composition change of the deposited film may result in a change in the film's optical constants which, together with the film's thickness, determine the transmittance and reflectance thereof. Accordingly, it will be appreciated that the bulk precipitation reaction may cause a deposited film to have a deteriorated uniformity and optical quality.

SUMMARY OF THE INVENTION

In accordance with the present invention, it has been found that the above-discussed bulk precipitation reaction can be retarded, and possibly completely prevented, without affecting the metal deposition reaction, by the addition of certain mono-carbonyl group containing compounds to be contemplated filming composition. While the precise function of the mono-carbonyl group containing additive is unknown, it is believed that the additive surrounds the metal cations on a molecular level and in a specific coordination so as to inactivate the metal cations toward bulk precipitation, but not toward film deposition, thus inhibiting bulk precipitation while permitting unhindered film formation. This result is unexpected and completely different from the results obtained with well known complex formers such as ethylene diamine tetraacetic acid, ethylene diamine, citric acid, levulinic acid, hydroxylamine, and the like, all of which retard or prevent both the bulk precipitation reaction and the film deposition reaction. For reasons presently unexplainable, it was found that many aldehydes such as formaldehyde, acrolein and glyoxal, and many di-ketones, such as acetyl-acetone also tend to retard or prevent both the bulk precipitation reaction and the film deposition reaction. Therefore, aldehyde and compounds containing more than one carbonyl group are excluded from the herein contemplated additives.

Among the mono-carbonyl group containing compounds found suitable for suppressing the bulk precipitation reaction, without significantly affecting the metal deposition reaction, are the alkyl ketones such as acetone, methyl ethyl ketone, methyl propyl ketone, methyl isopropyl ketone, methyl amyl ketone, methyl isoamyl ketone, methyl butyl ketone, methyl isobutyl ketone, methyl isopropenyl ketone, methyl hexyl ketone, ethyl butyl ketone, and the like; cyclic ketones such as cyclohexanone, cyclopentanone, cyclopentyl acetone and the like; condensed ketones such as diacetone alcohol, the condensation products of the useful alkyl and cyclic ketones listed here and the like. Compounds having aromatic groups and unsaturated linear chains attached to the carbonyl group are also suited to retard bulk precipitation.

Use of varying amounts of the present additives has been found effective for suppressing bulk precipitation, and thereby stabilizing the filming compositions in which they are employed. For example, the use of at least about 0.01 volume percent of the herein contemplated mono-carbonyl group containing materials, based on the volume of the metal salt solution comprising the filming composition, will significantly delay the onset of bulk precipitation. However, best results have been attained when the additive is employed in a concentration exceeding about 0.05 volume percent; preferably in concentrations ranging from about 0.1 to about 10.0 volume percent and most preferably from about 0.1 to about 2.0 volume percent.

Thus, in accordance with the present invention, it has been found that extremely uniform transparent metal-boron films, which are eminently suitable for use in conjunction with transparent viewing closures of all types, can be coated on a transparent substrate that is receptive to metal deposition by contacting the substrate with a specifically formulated mono-carbonyl compound containing alkaline solution of a metal compound, preferably a nickel compound, and a specifically formulated boron-containing reducing solution, preferably comprising an alkali metal borohydride. In a preferred embodiment, the mono-carbonyl compound comprises a ketone such as acetone, and the metal and the boron-containing solutions are applied to the receptive substrate separately, but substantially simultaneously. This may be done, for example, by applying the respective solutions as separate sprays which substantially simultaneously intermix and contact with the receptive substrate.

The herein contemplated filming compositions have been found to be effective over a broad temperature range for coating any of the so-called catalytic metal substrates or non-catalytic substrates sensitized in a conventional manner to promote deposition of continuous, adherent transparent metal films. However, one of the marked advantages of the present filming compositions is that they will deposit highly uniform transparent films when employed at about room temperature, i.e., from about 20° to 30°C.

BRIEF DESCRIPTION OF THE DRAWINGS

The invention will be more fully understood and appreciated in view of the examples to follow, taken in conjunction with the accompanying drawings wherein.

DETAILED DESCRIPTION OF THE PREFERRED EMBODIMENTS

As pointed out hereinabove, one feature of the present invention resides in adding a mono-carbonyl group containing compound selected from the group consisting of ketones and condensed ketones to a film forming composition which would normally undergo a relatively immediate film deposition reaction and a bulk precipitation reaction occurring substantially spontaneously after about an 8 to 20 second inhibition period, whereby the bulk precipitation reaction is effectively suppressed or possibly completely prevented without any noticeable effect on the fillm deposition reaction.

One way in which the herein contemplated filming compositions may be made is by mixing a mono-carbonyl group containing compound, selected from the group consisting of ketones and condensed ketones, with a specifically formulated solution of a metal compound, preferably a nickel compound, and then mixing the additive/metal solution with a specifically formulated boron-containing reducing solution, preferably comprising an alkali metal borohydride, to form the desired filming composition. The separate solutions may be formulated as follows:

Metal Containing Solution

In accordance with one embodiment of the present invention, the additive/metal containing solution may comprise an aqueous solution of a metal selected from the group consisting of nickel, iron, cobalt, and mixtures thereof, generally in the form of (a) a water soluble metal salt of an inorganic or organic acid, preferably the latter, especially acetic acid, (b) a mono-carbonyl group containing compound selected from the group consisting of ketones and condensed ketones, preferably acetone, (c) a small amount of an organic or inorganic acid, preferably boric acid, (d) a complexing or chelating agent such as gluconic acid or an alkali metal salt thereof, preferably sodium gluconate, and (e) sufficient alkaline material, preferably ammonium hydroxide, to maintain the pH of the solution above pH 7, generally between about pH 7 to pH 11, and preferably between about pH 7.2 and pH 7.6. In a preferred embodiment, the metal containing solution also includes (f) a nitrogen-hydrogen type additive (believed to be a complexer and leveling agent) such as hydrozine hydrate or hydrazine tartrate, and especially hydrozine sulfate, and (g) certain non-ionic or cationic wetting agents which are known not to precipitate heavy metals from solution. Examples of such wetting agents include certain cocoamine-ethylene oxide condensates such as Ethomeen C-15 and Ethomeen C-20 of Armour and Company, described more fully in the above mentioned related applications. The usual solvent for these components is water. However, water may be replaced partially or even completely with an organic solvent such as lower aliphatic alcohols, i.e., ethyl alcohol, propenol and the like.

As mentioned above, various salts of the contemplated metals and inorganic and organic acids soluble in aqueous solutions may be utilized. Metal salts having only slight solubility in aqueous solutions may be utilized inasmuch as active concentrations of the salt of the metal to be plated range from about 0.05 percent by weight to about 20 percent by weight of the solution. A preferred concentration is from about 0.5 percent by weight to about 10 percent by weight of the metal salt, e.g. the nickel salt, per unit weight of solution. Furthermore, the valence state of the solution metal ion appears to be unimportant. For example, cobaltous or cobaltic salts are generally equally effective.

Typical salts of organic acids useful in this invention includes: nickel acetate, nickel propionate, nickel citrate, nickel tartrate, cobalt acetate, cobalt citrate, iron acetate and the like, mixtures thereof and salts of soluble organic acids generally containing less than about 12 carbon atoms.

Typical inorganic metal salts useful in this invention include: nickel chloride, nickel bromide, nickel iodide, nickel sulphate, nickel fluoroborate, cobalt bromide, cobalt chloride, cobalt fluoride, iron chloride, iron bromide, iron sulphate, and the like and mixtures thereof.

The stability of the ultimate filming composition and the inhibition period between its preparation and the spontaneous occurrence of bulk precipitation reaction is greatly enhanced by the presence of acetone. Other mono-carbonyl group containing compounds, with the exclusion of most aldehydes, may also be utilized. FOr example, alkyl ketones such as methyl-ethyl-ketone, saturated cyclic ketones such as cylohexanone, condensed ketones such as and the like and mixtures thereof may also be used. For best results, it is desirable to include acetone as part of the mono-carbonyl group containing additive even though additional stabilizer materials may be present. The quantity of the herein contemplated mon-carbonyl group containing additives may vary over a relatively wide range. For example, a metal containing solution comprising at least about 0.05 percent by volume of such additives is suitable. However, the use of at least about 0.1 volume percent, and generally from about 0.1 to about 5.0 volume percent of such additives is preferred.

The formation of transparent films of metals such as nickel, cobalt, iron and mixtures thereof has been found to be greatly facilitated by the presence of boric acid. Other acids may also be utilized, for example, acetic acid, propionic acid, citric acid, tartaric acid, and the like. Boric acid has been found to promote film uniformity and to reduce the tendency of the metal film to peel from the substrate during drying. For best results, it is desirable to include boric acid in the metal containing solution even though additional acids may be present. The quantity of boric acid employed may vary over a relatively wide range. For example, a metal containing solution comprising from about 0.050 percent to about 3.5 percent to about 3.5 percent by weight boric acid is suitable. However, the use of a metal containing solution comprising from about 0.2 to about 1.0 percent boric acid is preferred.

A chelating agent, i.e. a compound which readily complexes metal ions in water solution, is effective in the alkaline metal containing solution to prevent precipitation of the dissolved metal compound. The preferred chelating agent is gluconic acid, or an alkali metal salt thereof, especially sodium gluconate. However, known chelating agents such as citric acid, glycolic acid, ethylene diamine, lactic acid, ethylene diamine tetraacetic acid, and the like are useful. The formation of transparent metal films of good optical characteristics is enhanced by the utilization of gluconic acid or sodium gluconate, especially the latter. The quantity of chelating agent utilized should be that which is sufficient to maintain the metal compound in solution at the contemplated operating temperatures. Generally, chelating agents are utilized in a mole-to-mole ratio for each mole of metal ion present, although it has been found that lesser quantities are effective with the dilute coating solutions of this invention. Thus, while good coatings are produced from metal solutions having a molar ratio of shelating agent to metal ion as low as 1:4, a molar ratio between about 1:2 to 3:1 is preferred for deposition of transparent metal films.

It has been found that the inclusion of certain compounds containing the radical linked to an inorganic radical or another nitrogen atom as part of the metal salt solution greatly enhances the quality of the resulting deposited film produced using a borohydride as a reducing agent. Thus, substantially mottle-free, unfirom, and fine-textured films are obtained when from about 0.01 percent by weight to about 1.0 percent by weight of the metal salt solution comprises hydrazine tartrate, hydrazine hydrate, hydroxylamine, phenylhydrazine, hydroxyl ammonium sulfate, and the like, and particularly hydrazine sulfate. Particularly high quality films are obtained when the metal salt solution comprises from about 0.04 to about 0.06 percent by weight of the above-described nitrogen-hydrogen type compounds, especially hydrazine sulfate. In this regard, it has been observed that the presence of such hydrazine compounds slightly regards the rate of film deposition. Accordingly, it is believed that the added hydrazine compound acts as a complexer and leveling agent that controls the rate of release of the metal ions from the complex thereof.

As pointed out briefly above, the inclusion of certain wetting agents as part of the metal salt solution has been found particularly effective for the deposition of transparent films of metals, for example, nickel, cobalt, iron, and the like. In this connection, certain non-ionic and cationic wetting agents which are known not to precipitate heavy metals from solution are generally preferred. Wetting agents particularly useful for this purpose include:

Cationic agents such as:

1. quaternary ammonium salts, for example, tetramethyl ammonium chloride and dipropyl dimethyl ammonium chloride; and
2. alkylene oxide condensation products of organic amines wherein a typical structure is wherein R is a fatty alkyl group preferably having about 12 to 18 carbon atoms, and $x$ and $y$ represent whole numbers from 1 to about 20, typical products of this type being ethylene oxide condensation products of cocoamines, soybean amines, and the like, having an average molecular weight of about 200 to about 3,000.

Non-ionic agents such as:
1. Alkylene oxide condensates of amides, for example, hydrogenated tallow amides having a molecular weight of about 200 to about 300, and oleyl amides wherein a typical structure is wherein R, $x$, and $y$ have the same significance as set forth immediately above for organic amine condensates; and,
2. Alkylene oxide condensates of fatty acids.

When employed in very small amounts ranging generally from about 0.001 to about 0.1 percent by weight of metal salt solution, e.g. from about 10 to about 1000 milligrams per liter of solution, and preferably from about 25 to about 100 milligrams per liter of solution, wetting agents of the above types are generally useful promoting film uniformity. Of particular utility are the alkylene oxide condensation products of organic amines which have been found to promote substantially mottle-free transparent films of nickel, cobalt, iron and mixtures thereof formed by the spray process described herein. Cocoamine-ethylene oxide condensates having molecular weight of greater than about 300 have been found especially effective for this purpose. Typical of the cocoamines that may be employed is Ethomeen C-15 of Armour and Company. This cocoamine is described hereinafter in the examples.

Thus, it will be appreciated that a particularly suitable metal containing solution may comprise the formulation set forth in Table 1.

Table 1

| Ingredient | Metal Salt Solution Concentration |
|---|---|
| Nickelous acetate | 0.5–50 grams/liter |
| Acetone | 0.05–5.0 milliliters/liter |
| Boric acid | 0.5–35 grams/liter |
| Sodium gluconate | 1.0–75 grams/liter |
| Hydrazine sulfate | 0.1–5.0 grams/liter |
| pH adjusted with ammonium hydroxide) | 7.0–10.5 |
| Ethomeen C-20 | 0.01–1.0 grams/liter |

The metal salt solution is preferably formed by dissolving a desired quantity of a metal salt in water and adding the desired amount of chelating agent. Next, the desired amount of a nitrogen-hydrogen type compound is dissolved separately in a minimum amount of water and added to the complexed metal salt. Boric acid is preferably added next and then the mono-carbonyl containing compound is added. Finally, the pH of the solution is adjusted to about pH 7 or greater with an alkaline material, preferably a hydroxide. Boric acid and/or the mono-carbonyl containing compound may be added before the chelating and nitrogen-hydrogen type agents, but the addition of these agents preferably precedes the addition of any alkaline materials.

To achieve the activity hereindescribed, the alkalinity of the metal containing solution should be maintained or buffered between a pH of 7 and 9.5, preferably between 7.2 and 7.6. Alkaline materials generally may be used for pH control although hydroxides such as sodium, potassium, and ammonium hydroxide are preferred, with best results being achieved with ammonium hydroxide. Such a solution is stable over long periods of time in the absence of the reducing agent. However, when mixed with the reducing agent it functions rapidly to produce a coating on a sensitized or active surface. Concurrently, metal precipitates from solution and thus the solution becomes spent. The metal precipitation occurs within seconds or may be inhibited for more than 5 minutes, depending upon acetone concentration.

During use, the temperature of the metal containing solution may vary over a relatively wide range so long as it is uniform from substrate to substrate. For example, uniform, transparent films may be deposited from a metal containing solution maintained at a temperature between about 35° and 100°F. Practically speaking, however, it is preferable to maintain the temperature of the metal containing solution between about 50° and about 90°F., and most preferable to maintain the temperature between about 60° and 85°F.

Reducing Solution

The reducing solution comprises an aqueous solution of a boron-containing reducing agent and has a pH greater than 7, preferably greater than about 9, inasmuch as boron-containing reducing agents oxidize very rapidly in acid and neutral solutions. Such solutions are comparatively stable. To achieve the rapid activity desired after the reducing solution is added to the metal solution, it is preferred that the pH of the intermixed solution, that is, the filming composition formed by intermixing the metal and reducing solutions at the surface of the substrate being coated, be at least 7, but below 9.5, and preferably between about 7 and 8.5. Best quality transparent films are formed when the reducing solution is maintained at a pH of about 11 to 12.5; the most preferred range of pH being from about 11.2 to about 11.7. Thus, the pH of the intermixed solution may be readily controlled by control of the respective reducing and metal solutions.

The boron-containing reducing agent may be present in the reducing solution in an amount equal to from about 0.01 to about 5.0 percent by weight based upon the weight of the reducing solution. While boron-containing reducing agents are effective in the aforementioned range, a preferred concentration of about 0.03 to about 1.0 percent by weight of reducing agent based upon the weight of the reducing solution is preferred. The balance of the solution usually is water although organic solvents such as the lower alcohols may be used if desired.

Exceptionally useful boron-containing reducing agents are the alkali metal borohydrides such as sodium borohydride, and potassium borohydride.

It has been found that films having superior uniformity and texture are obtained when the reducing solution includes a small amount of a wetting agent of the type described above to facilitate proper intermixing with the metal containing solution. In this connection, it has been found that from about 0.001 to about 0.1 percent by weight, e.g., from about 10 to about 1,000 milligrams of wetting agent per liter of solution and preferably from about 10 to about 50 milligrams of wetting agent per liter of solution is generally sufficient for this purpose.

Thus, it will be appreciated that a particularly suitable boron-containing reducing solution may comprise the formulation set forth in Table 2.

Table 2

| Ingredient | Reducing Solution Concentration |
|---|---|
| Sodium borohydride | 0.1–25 grams/liter |
| pH (adjusted with sodium hydroxide) | 10–12.5 |
| Ethomeen C-20 | 0.01–1.0 grams/liter |

Process

While the herein contemplated filming compositions are equally employable in batchwise and continuous deposition techniques, they are particularly advantageous when utilized in continuous spray deposition techniques. Generally speaking, when employed in such continuous spray techniques, the metal containing solution and reducing solution are each passed through separate spray guns so that the sprays intermix and uniformly contact the surface of substrates to be coated, the substrates advancing relative to the spray guns. However, it will be appreciated that the stabilizing action imparted by the herein contemplated monocabonyl group containing compounds enables the use of filming compositions that are premixed, homogenized, and delivered to the substrates being coated by means of any of the well known drip-type, curtain-type and/or spray-type systems. After remaining on the surface of the articles for a period of time sufficient to substantially deplete the intermixed solution of its filming capacity, the spent or dead solution is washed off.

Since the bulk precipitation reaction associated with an intermixed solution prepared in accordance with the present invention will be substantially suppressed, the desired film thickness can usually be deposited with a single spray application of filming composition. However, since such stabilized filming compositions will always be depleted of their filming capacity before any film deposited thereby becomes opaque, it may be desirable to spray the substrates several times with fresh solution. Thus, depending upon the various deposition parameters such as the line speed and the concentration and pH of the intermixed solution, the spraying and washing sequence may be carried out once, or may be repeated for each substrate as many times as necessary to prepare a final film thickness having the desired degree of transparency.

In practice, each of the metal and reducing solutions is sprayed separately, but preferably simultaneously, onto the precleaned and activated surfaces to be coated at a flow rate varying from about 10 to about 1,500 milliliters per minute per square foot of activated surface. Of course, the actual flow rate that is employed depends upon the concentration of the intermixed filming solution, the temperature and pH thereof, the transparency of the desired coating, the respective positions of the spray guns employed, the rate of advancement of the activated surfaces relative to the spray guns, and the like. Generally speaking, however, it is desirable to maintain the flow rates of the respective solutions such that the molar ratio of the boron-containing reducing agent and the metal being reduced vary from about 1:3 to about 3:1.

As discussed more fully in the herein incorporated Miller application, Ser. No. 57,451, entitled "Method of Producing Transparent Metal Films," it has been found generally perferable to employ multiple gun sets when coating with the herein contemplated stabilized compositions on a commercial scale. In this connection, each gun set would comprise a spray gun for the metal containing solution and a spray gun for the reducing solution, each operated at a flow rate varying from about 300 to about 2,000 milliliters of solution per minute per gun.

The herein contemplated stabilized solutions can be employed at temperatures in the range of from about 35° to about 100°F. for coating only those substrates which are receptive to metal deposition. For the deposition of films of nickel, cobalt, iron, and mixtures thereof, it is preferred to have a reactive metal substrate. Thus, in the formation of a transparent article, an appropriate substrate is a transparent article, an appropriate substrate is a transparent glass plate coated or at least activated with a transparent metal film or deposit of copper, aluminum, tungsten, cobalt, platinum, silver, boron, thallium, vanadium, titanium, nickel, gold, germanium, silicon, chromium, molybdenum, iron, tin, palladium, lead, indium, cadmium, zinc, and the like. For example, a transparent copper film could be deposited on a transparent glass or plastic substrate by means of vacuum deposition or sputtering, whereafter the copper coated substrate could be sprayed according to the teaching of this invention with a transparent coating of nickel, cobalt, iron, or a mixture thereof.

A further method of activating the substrate for chemical deposition with the solutions of the present invention may be accomplished in accordance with the teachings of U.S. Pat. No. 2,702,253 or U.S. Pat. No. 3,011,920, the teachings therein being incorporated herein by reference. Thus, the present filming compositions are applicable in forming transparent metal-boron films on activated clear plastic and glasses, especially soda-lime-silica glasses, as well as on a wide variety of activated glass, ceramic, glass-ceramic, siliceous and calcereous base compositions. For example, the present compositions can be used to provide metal-boron and particularly nickel-boron films on the following types of glasses; soda-lime-silica glasses; alkali-alumina-silica glasses, such as those containing lithia as a component alkali; alkali-zirconia-silica glasses; alkali-alumina-zirconia-silica glasses; borosilicate glasses, etc.

The soda-lime-silica glass to be treated can be a clear glass or it can be a colored glass tinted by the introduction of various conventional materials into the glass forming batch. These latter glasses are often referred to as heat absorbing glasses especially when they contain iron oxide. Representative soda-lime-silica glass bases which can be treated in accordance with this invention usually contain 65 to 75 percent by weight $SiO_2$, 10 to 18 percent by weight $Na_2O$, 5 to 15 percent by weight CaO, 0 to 5 percent by weight alumina oxide ($Al_2O_3$), 0 to 8 percent by weight $K_2O$, 0 to 8 percent by weight $B_2O_3$, 0 to 1 percent by weight iron oxide ($Fe_2O_3$), and 0 to 0.7 percent by weight of NaCl, $SO_3$, $As_2O_5$, BaO, NiO, CoO, $Na_2SO_4$ and Se and combinations thereof.

A representative range of composition for soda-lime-silica glasses is listed as follows (wherein the given amounts of metals listed are determined as their oxides, except as otherwise noted):

| Component | Percent by Weight |
|---|---|
| $SiO_2$ | 68–73.5 |
| $Na_2O$ | 12–17 |
| CaO | 7–12 |
| MgO | 2–4 |
| $Na_2SO_4$ | 0–0.8 |
| NaCl | 0–0.3 |
| $Fe_2O_3$ | 0.05–0.09 |
| $Al_2O_3$ | 0–3.5 |
| $B_2O_3$ | 0–6 |
| $K_2O$ | 0–1.5 |

The following examples demonstrate the effectiveness of the present invention and the experimental conclusions of these experiments are summarized in the drawings, FIGS. 1 – 6.

EXAMPLE I

In a series of laboratory runs, commercial test tubes having a diameter of 13 mm were filled with a dilute solution of stannous chloride (comprising about 0.2 percent by weight $SnCl_2 \cdot 2H_2O$ and having a pH of about 2.0). After about 1 minute, the test tubes were rinsed with demineralized water, refilled for about 1 minute with a dilute solution of palladium chloride (comprising about 0.01 percent by weight $PdCl_2$ and having a pH of about 1.7), again rinsed with demineralized water, and then set upright in a conventional test tube holder.

Each of the now sensitized test tubes was contacted with 5 ml of a nickel solution and 5 ml of a reducer solution formulated as follows:

| NICKEL SOLUTION | |
|---|---|
| Nickelous acetate | 5 grams |
| Boric acid | 2.5 grams |
| Sodium gulconate | 9 grams |
| Hydrazine sulfate | 0.5 grams |
| Ammonium hydroxide | pH adjusted to 7.2 |
| Water | added to form 1 liter of solution |
| REDUCER SOLUTION | |
| Sodium Borohydride | 0.5 grams |
| Sodium hydroxide | pH adjusted to 11.5 |
| Water | added to form 1 liter of solution |

In each run, the nickel solution and the reducer solution were placed together in a 50 ml beaker, shaken once for proper mixing, and poured immediately into one of the respective test tubes. After a given period of time, ranging from 0 to 3 minutes, each test tube was emptied, rinsed immediately with demineralized water and dried with compressed air. In each run the temperature of the respective solution was 72°F.

The luminous transmittance of each test tube was then measured using a Bausch and Lomb spectrophotometer in the green range at 525 nanometers with the beam passing horizontally through the respective tubes. The test tubes were held vertically relative to the beam passing through them, and the transmittance of a clear, non-coated identical test tube was taken as 100 percent.

Figure 1:
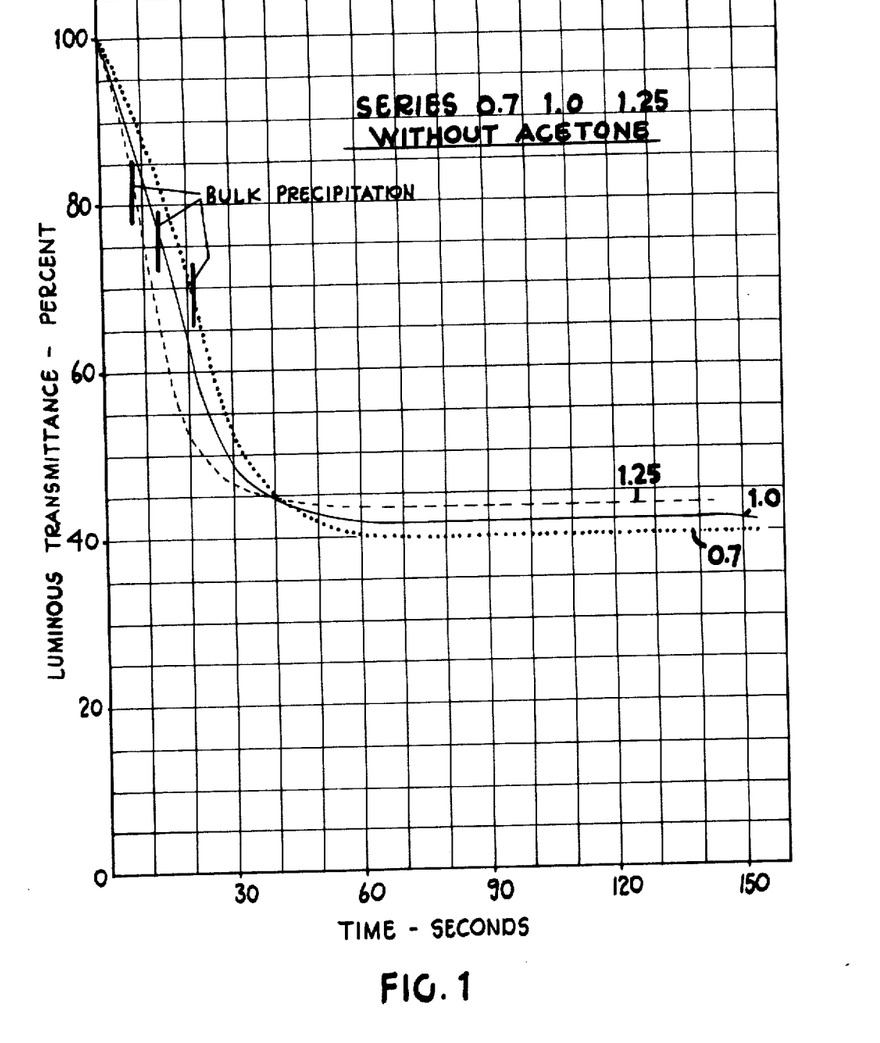
FIG. 1 is a graph illustrating the luminous transmittance of a metal coated test tube as a function of the plating time when plated with various metal salt/reducer concentrations in the absence of the herein contemplated mono-carbonyl group containing additives.

The results of these runs are illustrated in FIG. 1, under the designation "Series 1.0," wherein the measured luminous transmittance of each test tube is plotted against the plating time, in seconds.

EXAMPLE II

In a second series of runs, the procedure of Example I was followed utilizing nickel solution and reducer solution formulated as follows:

| NICKEL SOLUTION | |
|---|---|
| Nickelous acetate | 3.5 grams |
| Boric acid | 1.75 grams |
| Sodium gluconate | 6.3 grams |
| Hydrazine sulfate | 0.35 grams |
| Ammonium hydroxide | pH adjusted to 7.2 |
| Water | added to form 1 liter of solution |
| REDUCER SOLUTION | |
| Sodium borohydride | 0.35 grams |
| Sodium hydroxide | pH adjusted to 11.5 |
| Water | added to form 1 liter of solution |

The results of these runs are illustrated in FIG. 1, under the designation "Series 0.7" (The nickel solution and the reducer solution in this example are 70 percent as concentrated as the respective solutions employed in Example I).

EXAMPLE III

In a third series of runs, the procedure of Example I was again followed utilizing nickel solution and reducer solution 1.25 times as concentrated as the respective solutions in Example I. Thus, the nickel and reducer solutions used were as follows:

| NICKEL SOLUTION | |
|---|---|
| Nickelous acetate | 6.25 grams |
| Boric acid | 3.125 grams |
| Sodium gluconate | 11.25 grams |
| Hydrazine sulfate | 0.625 grams |
| Ammonium hydroxide | pH adjusted to 7.2 |
| Water | added to form 1 liter of solution |
| REDUCER SOLUTION | |
| Sodium borohydride | 0.625 grams |
| Sodium hydroxide | pH adjusted to 11.5 |
| Water | added to form 1 liter of solution |

The results of these runs are illustrated in FIG. 1 under the designation "Series 1.25." The vertical bars passing through the curves designated "Series 1.0," "Series 0.7," and "Series 1.25" represent the times at which bulk precipitation occurred.

As illustrated in FIG. 1, without the addition of the herein contemplated mono-carbonyl group containing material, plating started more rapidly at higher nickel and reducer concentrations. However, bulk precipitation also occurred more rapidly when more concentrated solutions were employed such that the plating

13 rate of the more concentrated solutions leveled off before the corresponding leveling off of the plating rates of the less concentrated solutions. The net result was that the ultimate luminous transmittance of the coated test tubes decreased with a decrease in the concentration of the solutions employed, and that each of the coatings was building up at a rapid rate when bulk precipitation occurred.

Retarding Bulk Precipitation

EXAMPLE IV

Figure 2:
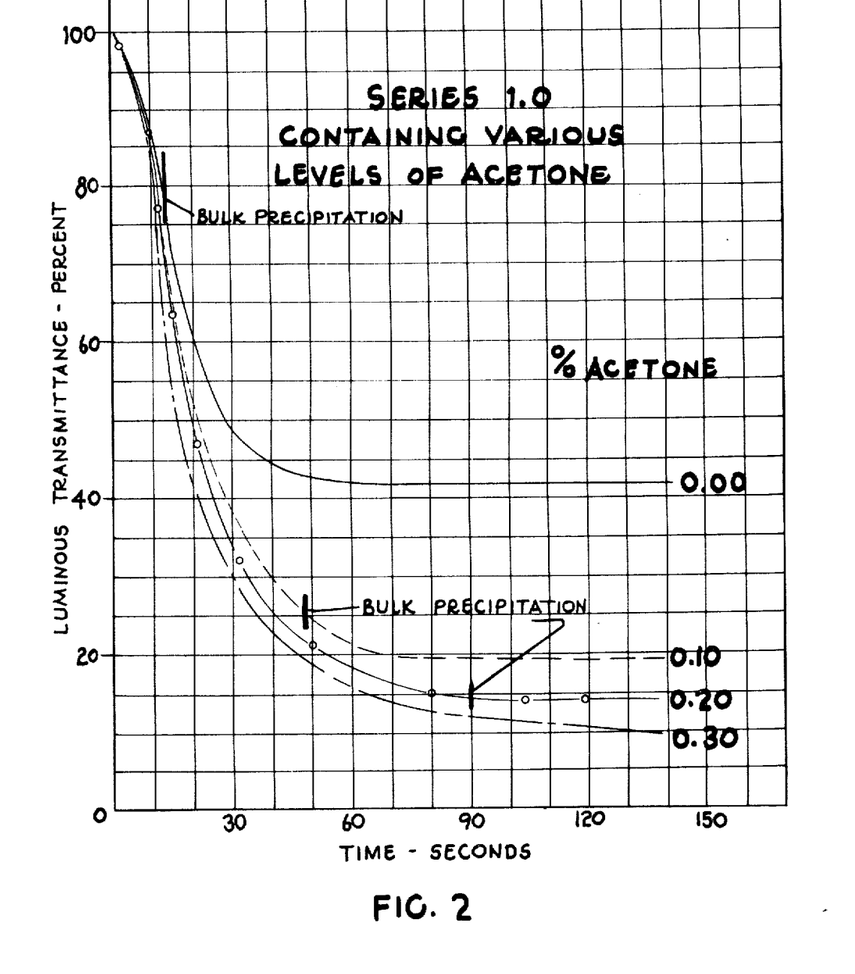
FIGS. 2 – 4 are graphs, similar to FIG. 1, illustrating the luminous transmittance of a metal coated test tube as a function of the plating time when plated with a predetermined metal salt/reducer concentration containing various concentration levels of acetone.

In a fourth series of runs, the procedure of Example I was followed except that a predetermined amount of Fisher certified electronic grade acetone was added to the nickel solution prior to the admixture of the nickel and reducer solutions. In each run, the amount of acetone added corresponded either to 0.00, 0.10, 0.20, or 0.30 volume percent based on the volume of the nickel solution. The results of these runs are illustrated in FIG. 2, wherein the luminous tansmittance of each test tube is plotted against the plating time. The vertical bar on each curve in FIG. 2 represents the point at which bulk precipitation occurred Bulk precipitation had not yet occurred after 5 minutes when 0.30 volume percent acetone was added. Thus, FIG. 2 graphically illustrates the ability to improve film deposition, by suppressing bulk, precipitation with the addition of small amounts of acetone. Moreover, FIG. 2 illustrates that the addition of only 0.30 volume percent of acetone to the "Series 1.0" metal/reducer solution can effectively completely prevent bulk precipitation from occurring, and thereby result in a metal coating that is free from optical defects attributable to a simultaneous occurrence of a bulk precipitation reaction.

EXAMPLE V

Figure 3:
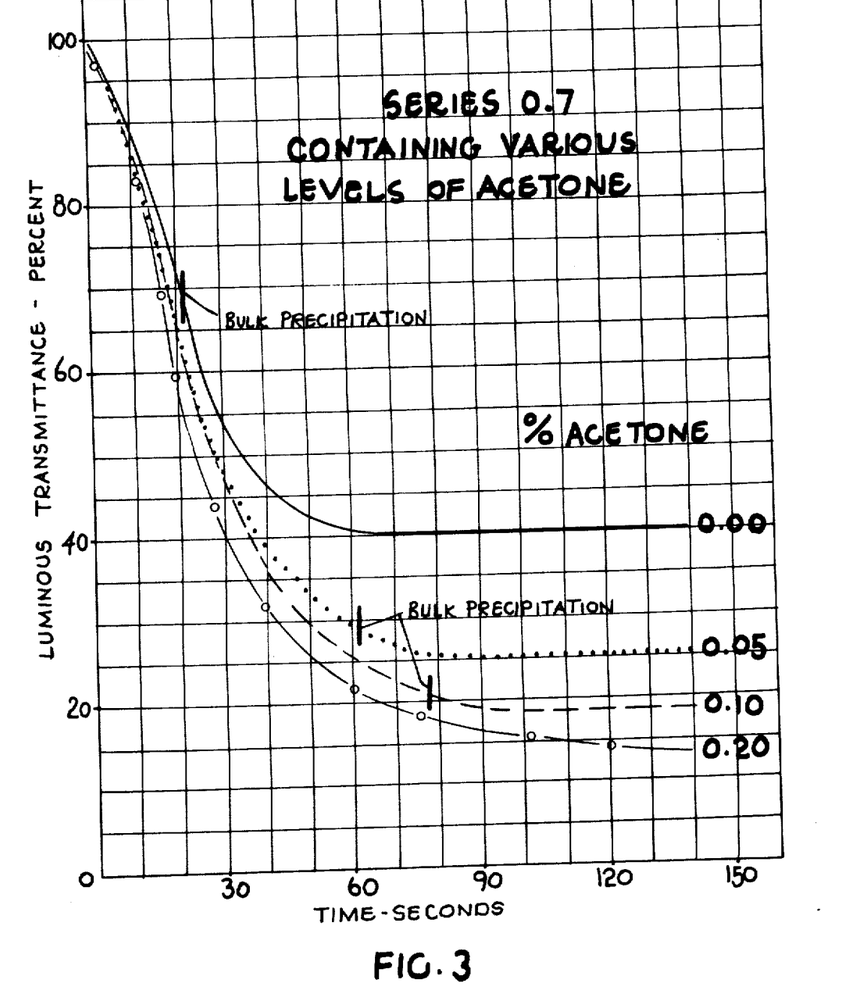

In a fifth series of runs, the procedure of Example II was followed except that a predetermined amount of Fisher certified electronic grade acetone was added to the nickel solution prior to the admixture of the nickel and reducer solutions. In each run, the amount of acetone added corresponded either to 0.00, 0.05, 0.10 or 0.20 volume percent based on the volume of the nickel solution. The results of these runs are illustrated in FIG. 3. As in FIG. 2, the vertical bar on each curve represents the point at which bulk precipitation occurred. Bulk precipitation had not yet occurred after five minutes when 0.20 volume percent acetone was added. Accordingly, this example illustrates that less acetone is required to retard bulk precipitation when less concentrated nickel/reducer solutions are employed.

EXAMPLE VI

Figure 4:
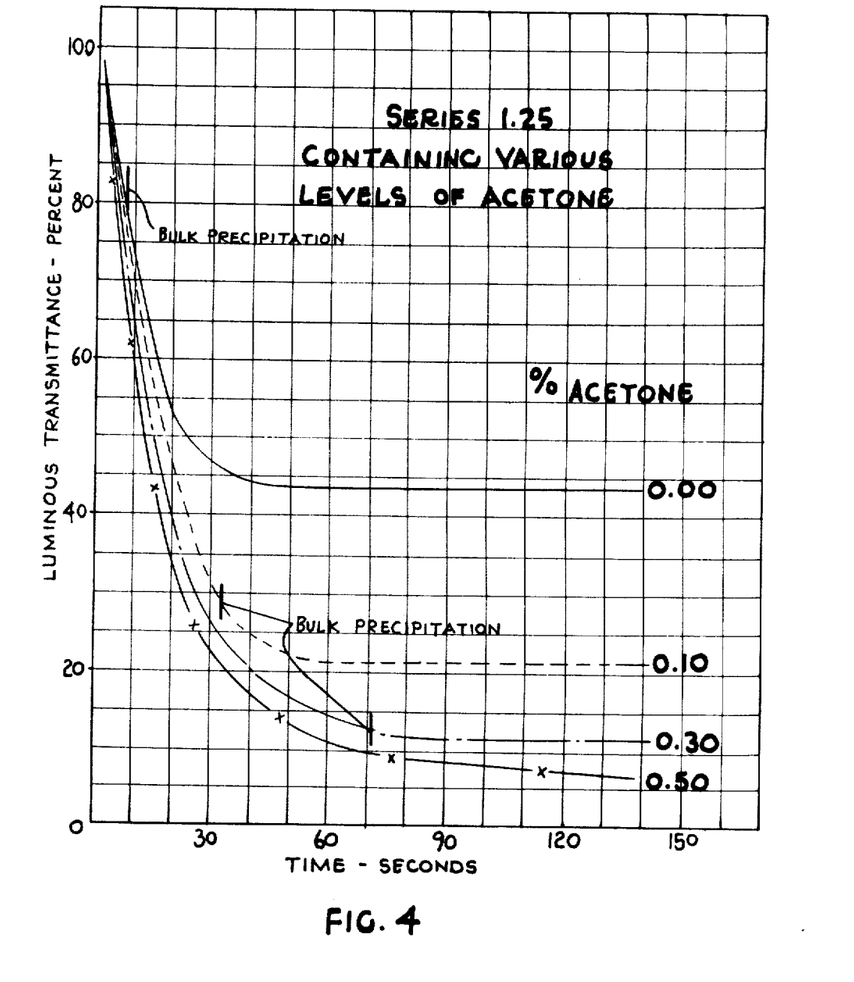

The procedure of Example III was followed except that a predetermined amount of Fisher certified electronic grade acetone was added to the nickel solution prior to the admixture of the nickel and reducer solution. In each run, the amount of acetone added corresponded either to 0.00, 0.10, 0.30, or 0.50 volume percent based on the volume of the nickel solution. The results of these runs are illustrated in FIG. 4, wherein the luminous transmittance of each test tube is plotted against the plating time. The vertical bar on each curve again represents the point at which bulk precipitation occured. Bulk precipitation had not yet occurred after five minutes when 0.50 volume percent acetone was added.

EXAMPLE VII

The procedure of Example I was followed except that various mono-carbonyl group containing materials were substituted for acetone to determine their effect on the bulk precipitation and film deposition reactions. While it was evident that acetone had the greatest retarding effect on the bulk precipitation reaction, it was found that other mono-carbonyl group containing materials, other than aldehydes, retarded the bulk precipitation reaction without appreciably affecting the film deposition reaction. The results of these runs are in Table 3.

TABLE 3

| Additive | Effect on Bulk Precipitation Reaction | Effect on Film Deposition Reaction |
|---|---|---|
| methyl ethyl ketone | Retarded or prevented | No appreciable effect |
| cyclohexanone | ″ | ″ |
| diacetone alcohol | ″ | ″ |
| ethylene diamine tetraacetic acid | ″ | Retarded or prevented |
| ethylene diamine | ″ | ″ |
| sodium citrate | ″ | ″ |
| levulinic acid | ″ | ″ |
| hydroxylamine | ″ | ″ |
| formaldehyde | ″ | ″ |
| glyoxal | ″ | ″ |
| acrolein | ″ | ″ |

EXAMPLE VIII

The procedure of Example II was followed except that the nickel solution was replaced with the following iron solution:

| Iron Solution | |
|---|---|
| Ferrous sulfate | 10 grams |
| Boric acid | 3 grams |
| Sodium gluconate | 7 grams |
| Hydrazine sulfate | 0.6 grams |
| Water | added to 1 liter |
| Ammonium hydroxide | added to pH 7.5 |
| Ethomeen C-20 | 0.06 grams (2 drops) |

Figure 6:
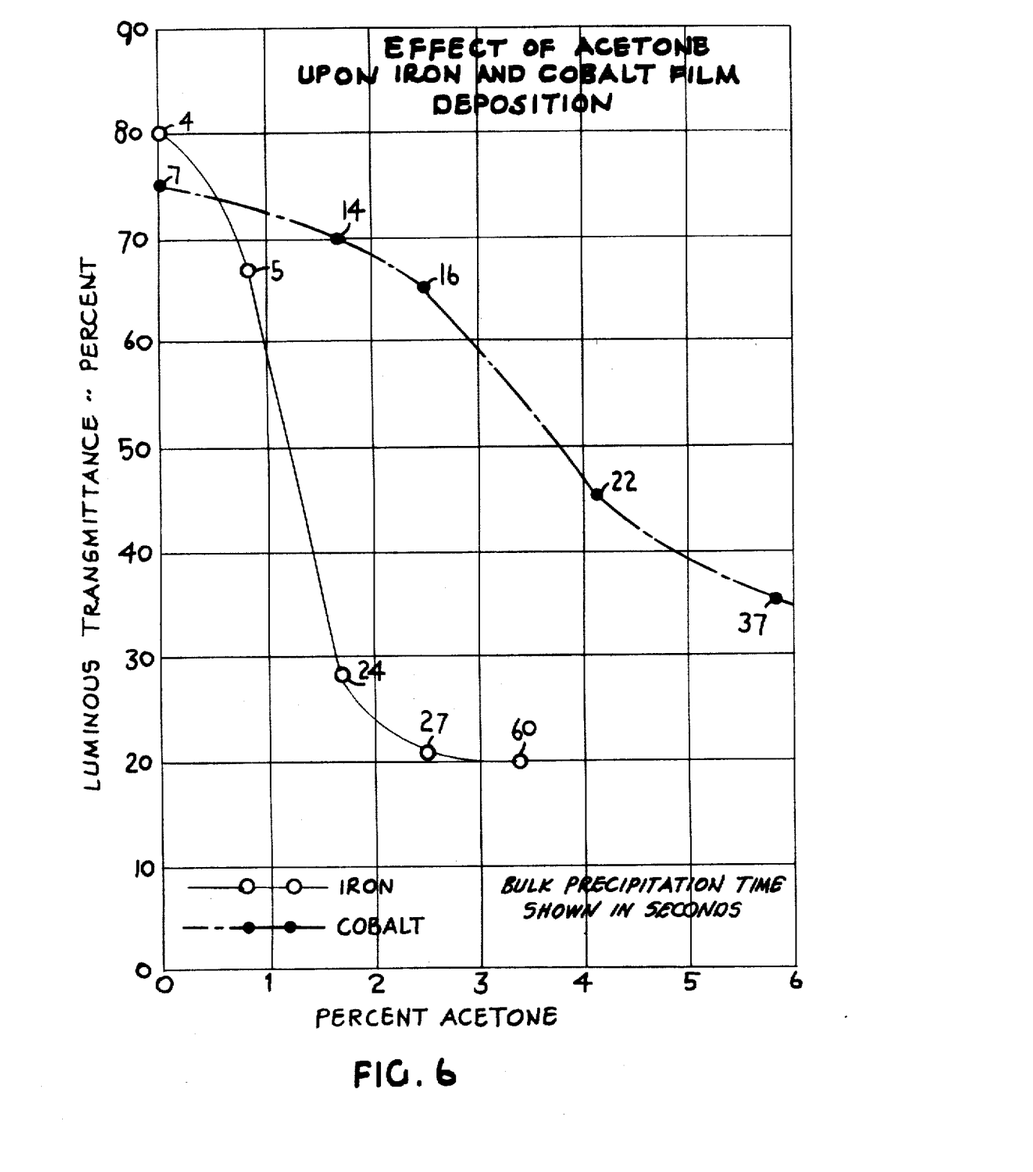
FIG. 6 is a graph, similar to FIG. 5, but extending additive concentration only to about the optimum, showing luminous transmittance of metal coated test tubes coated with cobalt and iron solutions and demonstrating a similar effectiveness of the contemplated mono-carbonyl containing additives in iron and cobalt solutions.

The results were similar to those shown graphically in FIG. 2 and are summarized in FIG. 6.

EXAMPLE IX

The procedure of Example II was followed except that the nickel solution was replaced with the following cobalt solution:

| COBALT SOLUTION | |
|---|---|
| Cobalt acetate | 4 grams |
| Boric acid | 2.5 grams |
| Sodium gluconate | 7 grams |
| Hydrazine sulfate | 0.7 grams |
| Water | added to 1 liter |
| Ammonium hydroxide | added to pH 7.2 |
| Ethomeen C-15* | |

*Ethomeen C-15 (trademark of Armour and Company) is a cocoamine having an average molecular weight of 422 and the following generalized formula:

wherein R is derived from a cocoamine and $x + y$ equals 5.

As in the case with the nickel and iron solutions, it was found that acetone retarded the cobalt bulk precipitation reaction without appreciably affecting the film deposition reaction. The results were similar to those shown graphically in FIG. 2 and are summarized in FIG. 6.

EXAMPLE X

A mixed nickel acetate and cobalt acetate solution was utilized to form a transparent cobalt-nickel and boron containing film. The procedure was similar to that employed in Example II except that the nickel solution was replaced with a cobalt-nickel solution having the following composition:

| METAL SOLUTION | |
|---|---|
| Cobalt acetate | 4 grams |
| Nickel acetate | 10 grams |
| Boric acid | 2.5 grams |
| Sodium gluconate | 7 grams |
| Hydrazine sulfate | 0.7 grams |
| Water | added to 1 liter |
| Ammonium hydroxide | added to pH 7.2 |
| Ethomeen C-15 | |

The results were similar to those illustrated in FIG. 2.

Figure 5:
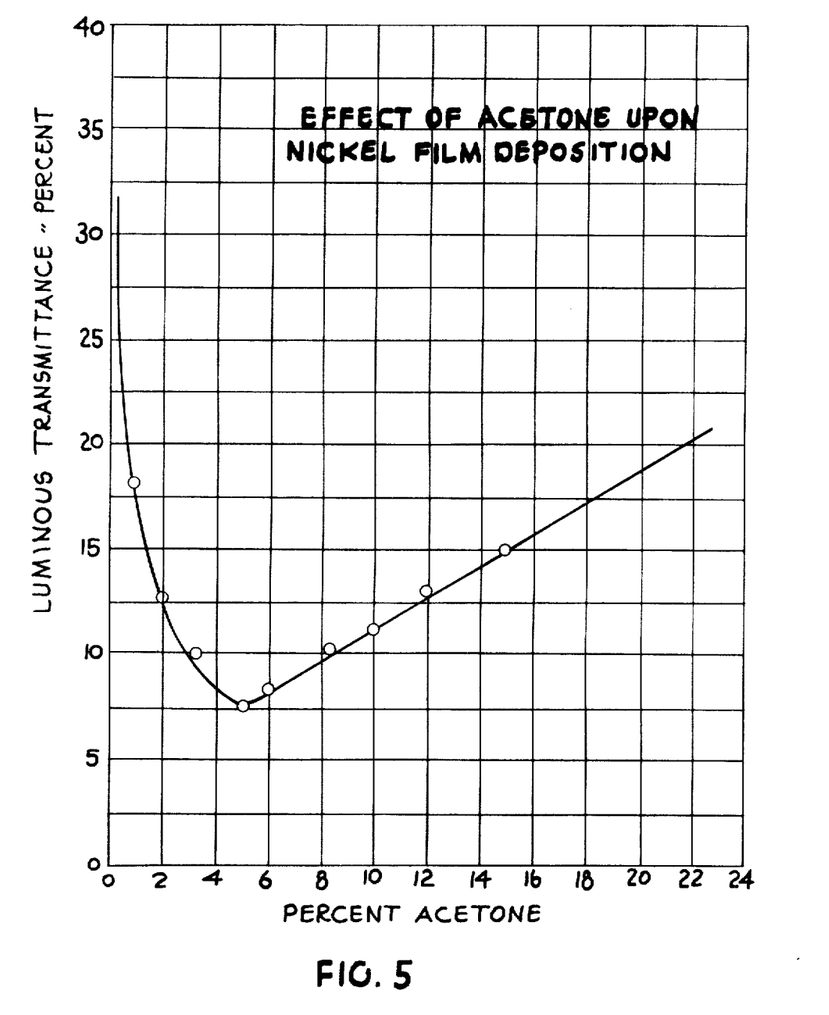
FIG. 5 is a graph illustrating the luminous transmittance of a metal coated test tube as a function of additive concentration in the metal solution for effectively infinite plating time demonstrating the effectiveness of small controlled amounts of additive and the ineffectiveness of large quantities of the same additive.

As noted in the examples above and as particularly pointed out in FIG. 5 the amount of mono-carbonyl containing compound which is effective is limited and well defined by the experimental procedure described. Excess mono-carbonyl containing compounds, as for instance in amounts which would be encountered if the organic material were present as a solvent, have no beneficial effect and have a deleterious effect relative to the controlled amounts of additives of this invention.

EXAMPLE XI

Figure 7:
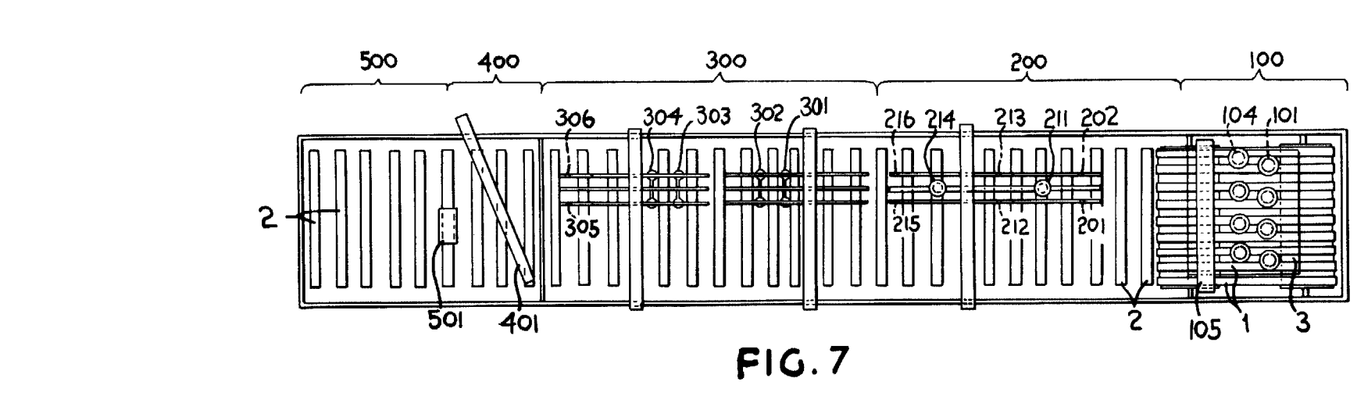
FIG. 7 is a schematic top plan view, with portions removed for the sake of clarity, of an apparatus suitable for use in preparing the transparent articles of the present invention on a continual basis, wherein section 100 represents a glass loading and cleaning section, section 200 represents a sensitizing and activating section, section 300 represents a metal-boron deposition section, section 400 represents a drying section and section 500 represents a film density measuring and unloading section.
Figure 8:
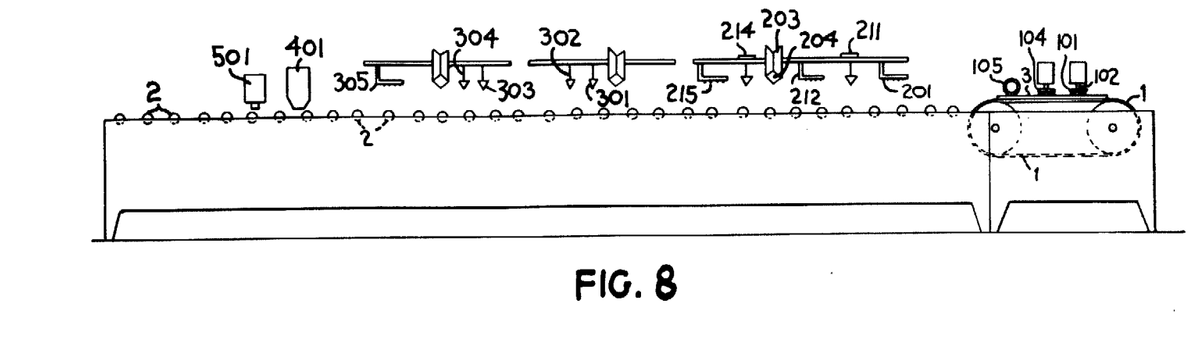
FIG. 8 is a schematic front elevational view of the apparatus of FIG. 7.

In order to demonstrate the applicability of the results obtained in Examples I — X to large scale continuous coating techniques, a plurality of 28 inch by 66 inch by one-quarter inch commercial soda-lime-silica glass plates were coated with a nickel-boron film with the apparatus illustrated schematically in FIGS. 7 and 8. As shown, the apparatus comprised five basic units or sections, which are designated the glass loading and cleaning section (section 100), the glass sensitizing and activating section (section 200), the metal-boron deposition section (section 300), the glass drying section (section 400) and the film density measuring and glass unloading section (section 500). The apparatus also comprised a conveyor means including a plurality of belts 1 in section 100 and rollers 2 in sections 200–500 for carrying and advancing the glass plates 3 past the various sections 100-500 in the direction illustrated by the arrow. The rollers 2 were rotated by conventional means (not shown) so as to advance the plates 3 at the rate indicated in Table 4.

In each run, a plate 3 was loaded onto the belts 1 and advanced through section 100 of the apparatus. In this section, four rotating blocks 101 comprised of 3 inch thick cattle hair felt brushes or equivalent of 8 inch diameter gently abraded the uppermost surface of the plates 3 with a mixture of cerium oxide and water to loosen and remove any dirt therefrom. The blocks were rotated about shafts 102 at a rate of about 350 rpm and were oscillated about 4 inches in the direction transverse to the advancing plates at a frequency of 15 cycles per minute. Four 6 inch diameter rotary cup brushes 104 were arranged at 12 inch centers in the transverse direction such that the longitudinal distance between the blockers 101 and the rotary cup brushes 104 was about 9 inches. The rotary cup brushes were equiped with No. 12 nylon bristles and were rotated at about 350 rpm. The brushes also oscillated about 4 inches in the transverse direction at a frequency of 15 cycles per minute and were supplied with a spray of water to remove any residual cerium oxide from the plates 3. After passing beneath the rotary cup brushes 104, each plate 3 advanced beneath a 6 inch diameter rotary cylinder brush 105 disposed transversely of the plates. The rotary cylinder brush comprised No. 12 nylon bristles and had its axis disposed 8 inches from rotary cup brushes.

Each plate 3 then entered into and passed through section 200 of the apparatus, wherein the surface thereof was sensitized and then activated. As illustrated, each plate was rinsed with demineralized water, as it entered section 200 to remove any traces of cerium oxide, tap water or any other undesirable matter carried over from section 100. The rinse was performed by employing a cross-fire technique wherein a mutually opposed pair of spray guns 201 and 202 were supported from a carriage 203 that reciprocated transversely of the plates 3 on a track 204 at a rate of about 54 single passes per minute. During the reciprocating motion of the carriage 203, demineralized water was fed to the guns 201 and 202 in intermittent fashion such that water was sprayed only from gun 201 when the carriage was moving in one direction (i.e., from bottom to top in FIG. 5), while water was sprayed only from gun 202 when the carriage was moving in the opposite direction. The guns 201 and 202 were tilted slightly toward each other to give a crossfire effect or sweeping action which tended to wash any excess water from the surface of the plates.

After undergoing an initial rinse with demineralized water, each plate advanced beneath a reciprocating gun 211 which srayed a dilute solution of stannous chloride on the clean surface. The composition of the stannous chloride solution is described below.

As the plate 3 continued to advance, it then passed under the intermediate or second set of cross-fire rinse guns 212 and 213. These guns were operated in the same manner as guns 201 and 202. The plate then passed under the palladium chloride gun 214 which sprayed an atomized mixture of air and a dilute solution of palladium chloride on the now sensitized surface so as to activate the surface for the ensuing metal-boron deposition. The composition of the palladium chloride solution is given below.

As illustrated, the first, second and third cross-fire rinse guns, as well as the tin gun and the palladium gun, i.e. all of the guns in section 200, were mounted from a single boom that reciprocated in the transverse direction at a rate of 54 single passes per minute. Each of the rinse guns comprised a single UniJet - T8001 spray nozzle (Spraying Systems Co., Bellwood, Ill.) operated at a pressure of about 40 psig. and an average flow rate of about 0.12 gallons of demineralized water per minute. Each of the tin and palladium guns comprises a single type C spray gun equipped with a Paasche U2, F2-8 nozzle (Paasche Air Brush Co., Chicago, Ill.) operated at an air pressure of about 30 to 70 psig. and at a flow rate of about 500 milliliters of the solution described below per minute. The distance between the rotary cylinder brush and the first cross-fire rinse guns 201 and 202 was 36 inches, while the distance from each gun or gun set in section 200 to the next respective gun or gun set was 18 inches.

Each plate was then advanced through section 300, wherein a metal-boron containing coating was deposited on the now activated surface of each plate by simultaneously spraying and intermixing a metal containing solution and a boron-containing reducing solution onto the activated surface such that the metal ions present in the contemplated metal solution became reduced to a transparent boron-containing metal film which tenaciously adhered to the activated surface. For the sake of illustration, section 300 is shown to have four gun sets 301-304 each comprising a metal containing solution gun and a mutually opposed reduced solution gun. Section 300 also includes a mutually opposed reduced solution gun. Section 300 also includes a mutually opposed pair of water spray guns 305 and 306 arranged for cross-fire rinsing. As shown, the guns 301-304 are supported for transverse reciprocating movement in the manner described above. However, it should be noted that the gun sets in section 300 were reciprocated in the transverse direction at a rate of 74 single passes per minute. During operation, each of the metal deposition gun sets in section 300 was maintained at a pressure of about 40 psig. and a flow rate of about 600 milliliters of solution per minute, while the final cross-fire rinse guns 305-306 were operated at a pressure of about 40 psig, and an average flow rate of about 0.12 gallons of demineralized water per minute.

The gun sets in section 300 of the apparatus were spaced apart from those in section 200 such that the distance between the last rinse guns in section 200 and gun set 301 was 54 inches. In addition, gun set 301 was spaced apart from gun set 302 such that the sprays generated from these sets (301-302) were overlapped, and such that the residence time of each plate in the spray area defined by gun sets 301 and 302 (spray area 1) was as indicated in Table 4. The residence time in the dwell area between gun set 302 and gun set 304 (dwell area I), the residence time in the spray area of gun set 304 (spray area II) and the residence time in the dwell area between gun set 304 and rinse guns 305-306 (dwell area II) are also noted in Table 4. Gun set 303 was not used. The metal/reducer gun sets (301-304) employed Paasche V2, F2-8 nozzles, while the rinse guns 305-306 each comprised a single UniJet - T8001 spray nozzle.

After undergoing a final water rinse under guns 305 and 306, each plate advanced into section 400 of the coating apparatus where it was dried with an air knife 401 comprising an elongated metal housing having an 0.002 inch delivery channel extending along the length thereof. The knife 401 was disposed at a 45 degree angle relative to the advancing plate and had its center-most portion spaced about 48 inches from the final rinse guns. The air knife was opeated at about 5 ounce/square inch guage and a flow rate of about 350 cfm. After passing beneath the air knife, each plate passed beneath a Gardner-Large Area Hazemeter 501 which measured and recorded the luminous transmittance of the coated plates.

The ambient air temperature was about 80°F., while the temperature of the demineralized and tap water used throughout these examples was about 63°F. The temperature of the metal and reducer solutions was about 80°F. On the basis of a liter of solution, each of the prepared aqueous solutions employed had the following composition:

NICKEL SOLUTION

| | |
|---|---|
| Nickelous acetate | 5 grams |
| Boric acid | 2.5 grams |
| Sodium gluconate | 9.0 grams |
| Hydrazine sulfate | 0.5 grams |
| Water | added to 1 liter |
| Ammonium hydroxide | added to pH 7.2 |
| Ethomeen C-20* | 1 drop per liter of solution |
| Acetone | See Table 4 |

*Ethomeen C-20 (trademark of Armour and Company) is a cocamine having an average molecular weight of 645 and the following generalized formula:

wherein R is derived from a cocoamine and $x + y$ equals 10.

REDUCING SOLUTION

| | |
|---|---|
| Sodium borohydride | 0.5 grams |
| Water | added to 1 liter |
| Sodium hydroxide | added to pH 11.5 |
| Ethomeen C-20 | ½ drop per liter of solution |

TIN SOLUTION

| | |
|---|---|
| Stannous chloride | 0.2 grams |
| Hydrochloric acid (12N) | 0.04 milliliters |
| Water | added to 1 liter |

PALLADIUM SOLUTION

| | |
|---|---|
| Palladious chloride | 0.2 grams |
| Hydrochloric acid (12N) | 0.04 milliliters |
| Water | added to 1 liter |

The pH of the intermixed nickel and borohydride solutions was about 7.7. The bulk precipitation time, the measured liminous transmittance, and the other significant parameters of each run are shown in Table 4.

TABLE 4

| Run No. | Line Speed | % Acetone, Based on volume of nickel solution | Bulk Precipitation time, seconds | Luminous Transmittance percent | Process Residence Time - Seconds | | | |
|---|---|---|---|---|---|---|---|---|
| | | | | | Spray Area I | Dwell Area I | Spray Area II | Dwell Area II |
| 1 | 3.75 ft/min. | 0 | 10 | 17 | 30 | 30 | 20 | 40 |
| 2 | 4.8 ft/min. | 0 | 10 | 20 | 25 | 25 | 16 | 32 |
| 3 | 4.8 ft/min. | 0.05 | 22 | 18 | 25 | 25 | 16 | 32 |
| 4 | 4.8 ft/min. | 0.10 | 35 | 17 | 25 | 25 | 16 | 32 |
| 5 | 4.8 ft/min. | 0.20 | 61 | 16 | 25 | 25 | 16 | 32 |

As can be seen from the data in Table 4, the addition of as little as 0.05 volume percent acetone into the nickel solution more than doubled the time required for bulk precipitation to occur. Similarly, the addition of 0.20 volume percent of acetone increased the bulk precipitation time greater than six-fold. In addition, it may be noted that the luminous transmittance of the coated plates decreased when the bulk precipitation reaction was retarded by the addition of acetone. Accordingly, it is evident that the addition of acetone to the herein contemplated metal salt solutions will enable the continuous coating of an activated glass plate to a predetermined level of luminous transmittance at increased line speeds and without the adverse effects on the characteristics of the coating attributable to a simultaneous occurrence of a metal deposition reaction and a bulk precipitation reaction.

EXAMPLE XII

The procedure of Example XI was followed except that the concentration of both the nickel solution and the reducer solution were only 70 percent as concentrated as those employed in Example XI, i.e., the respective solutions were formulated as follows:

NICKEL SOLUTION

| | |
|---|---|
| Nickelous acetate | 3.5 grams |
| Boric acid | 1.75 grams |
| Sodium gluconate | 6.3 grams |
| Hydrazine sulfate | 0.35 grams |
| Ammonium hydroxide | pH adjusted to 7.2 |
| Water | added to form 1 liter of solution |
| Ethomeen C-20 | 1 drop per liter of solution |
| Acetone | see Table 5 |

REDUCER SOLUTION

| | |
|---|---|
| Sodium borohydride | 0.35 grams |
| Sodium hydroxide | pH adjusted to 11.5 |
| Water | added to form 1 liter of solution |
| Ethomeen C-20 | ½ drop per liter of solution |

The bulk precipitation time, the measured luminous transmittance, and the other significant paramters of each run are set forth in Table 5.

dition to the mono-carbonyl group; thus, fructose having 5 hydroxyl groups has been found not particularly suited to retard bulk precipitation.

Although specific embodiments of the instant invention have been set forth hereinabove, the invention is not intended to be limited thereto but includes all of modifications and variations falling within the scope of the following claims.

We claim:

1. In a method for stablizing an aqueous chemical filming composition comprising (a) a water soluble compound of a reducible metal selected from the group consisting of nickel, cobalt and iron and mixtures of such compounds in an effective amount to deposit a film on a substrate when reduced in contact therewith; and (b) a borohydride reducing agent for the contemplated metal in an effective amount to reduce the water soluble, reducible metal; wherein the filming composition is capable of depositing a film on a sensitized substrate and is characterized by its instability due to bulk precipitation; the improvement comprising the addition of a mono-carbonyl containing compound having an active carbonyl selected from the group consisting of ketones, condensed ketones, and mixtures thereof in an effective amount to stabilize the composition against bulk precipitation of the reducible metal while permitting the composition to retain its capability of depositing a film on a sensitized substrate at a rate that is substantially undiminished relative to the effective deposition rate of the unimproved composition.

2. The method of claim 1 wherein the mono-carbonyl containing compound contains less than 5 active radicals in addition to the carbonyl group.

3. The method of claim 1 wherein the mono-carbonyl containing compound is selected from the group consisting of alkyl ketones, cyclic ketones, condensation alcohols of alkyl ketones and cyclic ketones and mixtures thereof.

4. The method of claim 3, wherein the mono-carbonyl containing compound is selected from the group consisting of acetone, methyl ethyl ketone, cyclohexanone, diacetone alcohol, and mixtures thereof.

5. The method of claim 4, wherein the mono-carbonyl containing compound is acetone.

6. The method of claim 1, wherein the metal com-

TABLE 5

| Run No. | Line Speed | % Acetone, Based on volume of nickel solution | Bulk Precipitation time, seconds | Luminous transmittance percent | Process Residence Time – Seconds | | | |
|---|---|---|---|---|---|---|---|---|
| | | | | | Spray Area I | Dwell Area I | Spray Area II | Dwell Area II |
| 1 | 3.75 ft/min. | 0 | 21 | 25 | 30 | 30 | 20 | 40 |
| 2 | 3.75 ft/min. | 0.025 | 34 | 21 | 30 | 30 | 20 | 40 | not more than 2 active radicals should be present in addition.

The data in Table 5 substantiate the results obtained in connection with Example XI. Thus, for a fixed line speed, it is clear that the addition of acetone to the metal solution will significantly retard the bulk precipitation reaction and simultaneously result in a coated plate having a lower luminous transmittance.

To be effective the mono-carbonyl group should be active, that is it should not be intimately surrounded by or masked by interfering active radicals, such as amino, nitro, hydroxyl and carboxyl groups, branching from adjacent or closely spaced elements attached to the mono-carbonyl group. Not more than 4 and preferably pound is a nickel compound.

7. The method of claim 6, wherein said nickel compound is nickel acetate.

8. The method of claim 1, further comprising a deposition retarding nitrogen-hydrogen compound selected from the group consisting of hydrazine, hydrazine salts, hydroxylamines, phenylhydrazine and mixtures thereof.

9. The method of claim 8, wherein said nitrogen-hydrogen compound is hydrazine sulfate.

10. The method of claim 1, wherein said borohydride reducing agent is an alkali metal borohydride, the pH of said composition being between 7 and 9.

11. The method of claim 1 wherein the mono-carbonyl containing compound is present from 0.05 to 10 percent by volume of a metal containing portion of the composition which constitutes from about 25 to 75 percent by volume of the composition.

12. In a method for stabilizing an aqueous chemical filming composition comprising a mixture of an aqueous metal compound containing solution and an aqueous reducing solution for reducing the contemplated metal in effective amounts to deposit a film on a substrate when together in contact therewith; said metal compound containing solution comprising a water soluble compound of a reducible metal selected from the group consisting of nickel, cobalt and iron and mixtures of such compounds, said reducing solution comprising an alkali metal borohydride reducing agent for said reducible metal and sufficient alkaline material so that said mixture has an initial pH greater than 7 upon mixing the two solutions, wherein said mixture is capable of depositing a film on a sensitized substrate and is characterized by its instability due to bulk precipitation; the improvement comprising the addition of a mono-carbonyl containing compound having an active carbonyl selected from the group consisting of ketones, condensed ketones, and mixtures thereof in an effective amount to stabilize the composition against bulk precipitation of the reducible metal while permitting thee composition to retain its capability of depositing a film on a sensitized substrate at a rate that is substantially undiminished relative to the effective deposition rate of the unimproved composition.

13. The method of claim 12, wherein the reducible metal compound is a nickel compound.

14. The method of claim 12, wherein said metal solution includes a deposition retarding nitrogen-hydrogen compound selected from the group consisting of hydrazine, hydrazine salts, hydroxylamines, phenylhydrazine and mixtures thereof.

15. The method of claim 14, wherein said nitrogen-hydrogen compound is hydrazine sulfate.

16. The method of claim 12, wherein the mono-carbonyl containing compound is present from 0.05 to 10 percent by volume of the metal compound containing solution.

17. The method of claim 12, wherein said metal compound containing solution includes boric acid, a deposition retarding nitrogen-hydrogen compound selected from the group consisting of hydrazine, hydrazine salts, hydroxylamines, phenylhydrazine and mixtures thereof, a chelating agent for the reducible metal and sufficient alkaline material to provide said metal solution with a pH of 7.0 to 10.5, and wherein said reducing solution comprises sufficient alkaline material to provide said mixture with an intial pH of 7 to 9.

18. The method of claim 17, further comprising a wetting agent.

19. The method of claim 18, wherein:

said metal compound containing solution, on a one liter basis, consists essentially of

| | |
|---|---|
| Nickelous acetate | 0.5–50 grams |
| Acetone | 0.05–5.0 milliliters |
| Boric Acid | 0.5–35 grams |
| Sodium gluconate | 1.0–75 grams |
| Hydrazine sulfate | 0.1–5 grams |
| Wetting Agent | 0.01–1.0 grams |
| Ammonium hydroxide | To pH 7.0–10.5; and | said reducing solution, on a one liter basis, consists essentially of

| | |
|---|---|
| Sodium borohydride | 0.1–25 grams |
| Wetting Agent | 0.01–1.0 grams |
| Sodium hydroxide | To pH 10–12.5; and | said metal solution and said reducing solution are present in proportions from about 1 part metal solution to 3 parts reducing solution to about 3 parts metal solution to 1 part reducing solution.

* * * * *